US011042922B2

United States Patent
Onoro Rubio et al.

(10) Patent No.: US 11,042,922 B2
(45) Date of Patent: Jun. 22, 2021

(54) METHOD AND SYSTEM FOR MULTIMODAL RECOMMENDATIONS

(71) Applicant: NEC Laboratories Europe GmbH, Heidelberg (DE)

(72) Inventors: Daniel Onoro Rubio, Heidelberg (DE); Mathias Niepert, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 399 days.

(21) Appl. No.: 15/860,724

(22) Filed: Jan. 3, 2018

(65) Prior Publication Data
US 2019/0205964 A1    Jul. 4, 2019

(51) Int. Cl.
*G06Q 30/06*    (2012.01)
*G06N 5/02*    (2006.01)

(52) U.S. Cl.
CPC .......... *G06Q 30/0631* (2013.01); *G06N 5/02* (2013.01)

(58) Field of Classification Search
CPC ............................ G06Q 30/0631; G06N 5/02
USPC ........................................................ 705/26.7
See application file for complete search history.

(56) References Cited

U.S. PATENT DOCUMENTS

| | | | |
|---|---|---|---|
| 2002/0065797 A1* | 5/2002 | Meidan | G06Q 30/02 |
| 2012/0158633 A1 | 6/2012 | Eder | |
| 2016/0110794 A1 | 4/2016 | Hsiao et al. | |
| 2016/0189028 A1 | 6/2016 | Hu et al. | |
| 2017/0140262 A1* | 5/2017 | Wilson | G06N 3/02 |
| 2017/0300534 A1* | 10/2017 | Fu | G06N 20/00 |
| 2018/0232443 A1* | 8/2018 | Delgo | G06F 16/35 |

OTHER PUBLICATIONS

Yu Zhao, Sheng Gao, Patrick Gallinari, Jun Guo, Zero-Shot Embedding for Unseen Entities in Knowledge Graph, Jul. 2017, IEICE Trans. INF. & Syst., vol. E100-D, No. 7 pp. 1440-1445. (Year: 2017).*
A. Bordes, et al., "Translating embeddings for modeling multi-relational data", Advances of Neural Information Processing Systems, pp. 2727-2795, Dec. 2013.
Andreas Veit, et al., "Learning Visual Clothing Style with Heterogeneous Dyadic Co-occurrences", International Conference on Computer Vision (ICCV), pp. 1-9, Sep. 24, 2015.
B. Romera-Paredes, et al., "An embarrassingly simple approach to zero-shot learning", Proceedings of the 32$^{nd}$ International Conference on Machine Learning, vol. 37, pp. 1-10, Dec. 2015.

(Continued)

*Primary Examiner* — Jason B Dunham
*Assistant Examiner* — Brittany E Bargeon
(74) *Attorney, Agent, or Firm* — Leydig, Voit & Mayer, Ltd.

(57) ABSTRACT

A method for generating a product recommendation in a retail system includes collecting a dataset containing a plurality of entities and attributes for the entities. Relationships between the plurality of entities are generated. The plurality of entities, attributes and relationships are stored in a knowledge graph. A representation of the plurality of entities, attributes and relationships stored in the knowledge graph is learned. Zero-shot learning is performed for a new entity and attributes for the new entity. The new entity and attributes for the new entity are stored in the knowledge graph. A recommendation for a user is generated based on the knowledge graph.

15 Claims, 6 Drawing Sheets

(56) References Cited

OTHER PUBLICATIONS

Francesco Ricci, et al., "Chapter 1: Introduction to Recommender Systems Handbook", Recommender Systems Handbook, pp. 1-35, Dec. 2011.
Fuzheng Zhang, et al., "Collaborative Knowledge Base Embedding for Recommender Systems", KDD'16, pp. 1-10, Aug. 13-17, 2016.

* cited by examiner

METHOD AND SYSTEM FOR MULTIMODAL RECOMMENDATIONS

FIELD

The present invention relates to a method and system for generating product recommendations based on a multimodal knowledge graph representation that supports logic-based reasoning among entities and zero-shot learning.

BACKGROUND

Standard recommendation systems use product ratings provided by users. For example, when a user buys a product the user may provide a rating of the product. Additionally, a user may provide a rating for products the user owns or has used in the past. Standard recommendation systems apply variants of collaborative filtering or matrix factorization algorithms to the ratings. A standard recommendation system requires having an entity (such as a product) during the training in order to ask questions about it. Therefore, new entities that were not included during the training cannot to be used to answer questions.

Standard recommendation systems also profile users. User profiling is often performed by clustering user by similarities between their attributes or by different statistics between groups. For example, a standard recommendation system may profile users based on the types of products they purchase.

By combining the product ratings and profile information for a user, a standard recommendation system can make basic product recommendations for a user. The recommendations can only be made for products that the system has been trained on. New products must go through the training process before the system can make recommendations for them.

SUMMARY

In one embodiment, a method for generating a product recommendation in a retail system is provided. The method includes collecting a dataset containing a plurality of entities and attributes for the entities. Relationships between the plurality of entities are generated. The plurality of entities, attributes and relationships are stored in a knowledge graph. A representation of the plurality of entities, attributes and relationships stored in the knowledge graph is learned. Zero-shot learning is performed for a new entity and attributes for the new entity. The new entity and attributes for the new entity are stored in the knowledge graph. A recommendation for a user is generated based on the knowledge graph.

In another embodiment, a recommendation system comprising one or more processors which, alone or in combination, are configured to provide for performance a number of steps. A dataset containing a plurality of entities and attributes for the entities is collected. Relationships between the plurality of entities are generated. The plurality of entities, attributes and relationships are stored in a knowledge graph. A representation of the plurality of entities, attributes and relationships stored in the knowledge graph is learned. Zero-shot learning is performed for a new entity and attributes for the new entity. The new entity and attributes for the new entity are stored in the knowledge graph. A recommendation for a user is generated based on the knowledge graph.

BRIEF DESCRIPTION OF THE SEVERAL VIEWS OF THE DRAWINGS

The present invention will be described in even greater detail below based on the exemplary figures. The invention is not limited to the exemplary embodiments. All features described and/or illustrated herein can be used alone or in different combinations in embodiments of the invention. The features and advantages of various embodiments of the present invention will become apparent by reading the following detailed description with reference to the attached drawings which illustrate the following.

DETAILED DESCRIPTION

Figure 1:
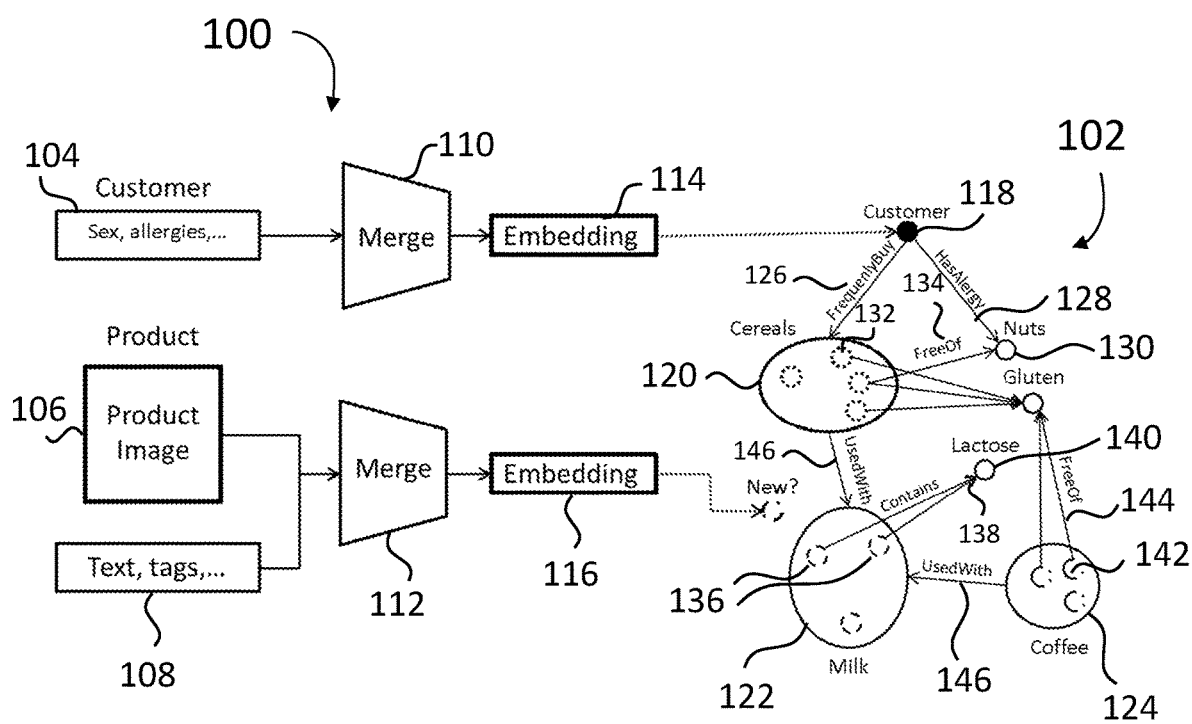
FIG. 1 illustrates a system architecture of a product recommendation system according to an embodiment.

A problem unique to computerized recommendation systems and solved by embodiments of the present invention is training the recommendation system for new product recommendations. Embodiments provide a knowledge graph, where entities can be products, users, or symbolic information. The relationships in the knowledge graph are links between the entities. The system creates a vector representation of each entity, called embedding, that fits a target knowledge graph and satisfies a predefined set of logical rules in the form "if condition p, it implies q", for example: if userX has allergy to nuts, and productP has nuts, it implies userX has allergy to productP. Additionally, as opposed to conventional recommendation systems, which require training for new products, the recommendation system of embodiments of the present invention can make recommendations for new products using zero-shot learning.

In an embodiment, the invention provides a method that allows the system to perform zero-shot learning. This allows the system to respond to inquiries about new entities. Using zero-shot learning, the system does not have to perform a learning process on the new entities before it can respond to inquiries. The usage of images, text, and other data modalities add to the perceptual information for an entity such as the shape, or the design of a product. Various data modalities also allow the system to make inferences for entities that were not included in the learning process or training.

Further, the system can perform a fine-grained reasoning between various entities. Given a set of rules and a learned embedding representation of the entities, the system is able to infer new links and logical rules between the entities. For example, given the triplet (userX, has Allergy, nuts), and the triplet (cereal, contains, nuts), the system can infer the new rule (userX, has Allergy, cereal).

In some embodiments, the system is used in a recommendation system. The system may answer questions between the entities to generate rankings of products. The product rankings may be used to aid the customer to find products of interest.

Product recommendations can be made as a customer shops, based on the customer shopping basket, or at any time with a direct query of the customer. The rankings can also be directly affected by various modifications that an owner may make to certain products or groups of users to increase the visibility or position of products. For example, the system may provide a ranked list of product recommendations to a user. The owner, such as a retailer, may make modifications to product attributes in the recommendation system to increase the product ranking.

Embodiments provide methods and systems to combine multiple data modalities from entities, such as products and users, to build a knowledge graph. The knowledge graph captures various relationships between the entities. The system performs logical reasoning based on a predefined set of rules. The system infers new links between the graph entities and works in the zero-shot learning setting. In a zero-shot learning setting, the system develops links between new entities and existing entities without having to perform a training process on the new entities.

Data modalities may include, for example, perceptual data such as images, numerical features (size, price, ingredients, demographic data, etc.), and textual descriptions and reviews. The perceptual data provides the system with the capability to include design features in the knowledge graph. The textual description and reviews provide the sentiment of other users that bought or reviewed a product. Other numerical and categorical data can be added to the system in order to incorporate aspects of an entity. For example, dimensions, product category information and other categorical data provide the system with additional information for an entity.

FIG. 1 illustrates a system architecture of a product recommendation system 100 according to an embodiment. Multiple data sources are combined and projected into a common embedding space 102. The data sources include user, or customer information 104. The customer information 104 may include gender, age, civil status, location, health conditions, such like allergies, high blood pressure, diabetes, etc. Other inputs include information about a product including a product image 106 and textual information 108, such as text and tags about the product. Customer information 104 is processed by a merge block 110. The merge block 110 produces a vector representation of the customer information 104. Similarly, merge block 112 produces a vector representation of the product information 106 and 108. The vector representation from the merge block 110 is then processed by embedding block 114. Similarly, the vector representation from the merge block 112 is then processed by embedding block 116. The outputs of the embedding blocks 114 and 116 are combined into an embedding space 102. The merge blocks and embedding blocks are shown in detail in FIG. 2.

In the embedding space 102, a knowledge graph encodes various relationships that link different entities together. An entity may be any type of input to the system. For example, entities include a user, a group of users, a product, a group of products of a certain category, or a symbolic category (i.e.: a category that have an abstract meaning, or it cannot be exactly represented by a set of attributes. For example: BioFood). It is possible to encode complex relationships between costumers and products. The relationships can be applied in physical shop or in an e-commerce setting to offer personalized recommendations about different products to the costumer.

The embedding space 102 is a set of points in an artificial space (latent space) that encodes the information. The knowledge graph is a data structure, that represents relationships between entities. For example, (Tomato, isUsedFor, Salad), and (cesarSource, isUsedFor, Salad) are two triplets of a possible knowledge graph. Additionally images of tomatoes, different cesar source brands bottles, and salad can be obtained. The system then learns a projection to an embedding space (or latent space), that encodes the relationships that are given by the knowledge graph. Thereafter, if the system receives an input of a new photo of a tomato, and the relationship isUsedFor, we may get the answer Salad.

In the illustrated embodiment, information for a customer 118 and product entities such as cereals entity 120, milk entity 122 and coffee entity 122 is shown in the embedding space 102. A "frequently buy" relationship 126 is shown between the customer 118 and the cereals entity 120 is shown. Similarly, an "allergy" relationship 128 is shown between the customer 118 and nuts 130. A specific cereal 132 has a "free of" relationship 134 with nuts 130. Based on these relationships, the system can make appropriate cereal recommendations for the user 118.

Similarly, the illustrated embodiment shows specific milks 136 with a "contains" relationship 138 to lactose 140. Likewise, specific coffees 142 have a "free of" relationship 142 with gluten 144. The embedding space 102 maintains a "used with" relationship 146 between the cereals entity 120 and the milk entity 122, and between the coffee entity 124 and the milk entity 122. While FIG. 1 shows a limited number of products and relationships for illustrative purposes, large numbers of product entities and relationships are used in the embedding space 102.

In one embodiment, based on the entities and relationships in the embedding space 102, a system can generate rankings of products that may be of interest to a customer.

In some embodiments, the structure of the knowledge graph and a set of logical rules are predefined. The knowledge graph consists of an initial set of entities and the relationships between them. The logical rules define conditions, such as (product, contains, gluten) and (user, intolerance, gluten), and outcomes, such as "do not recommend the product".

After the knowledge graph is created, an existing dataset with various products and users can be input into the knowledge graph. The system generates the vector representations for the dataset.

Figure 2:
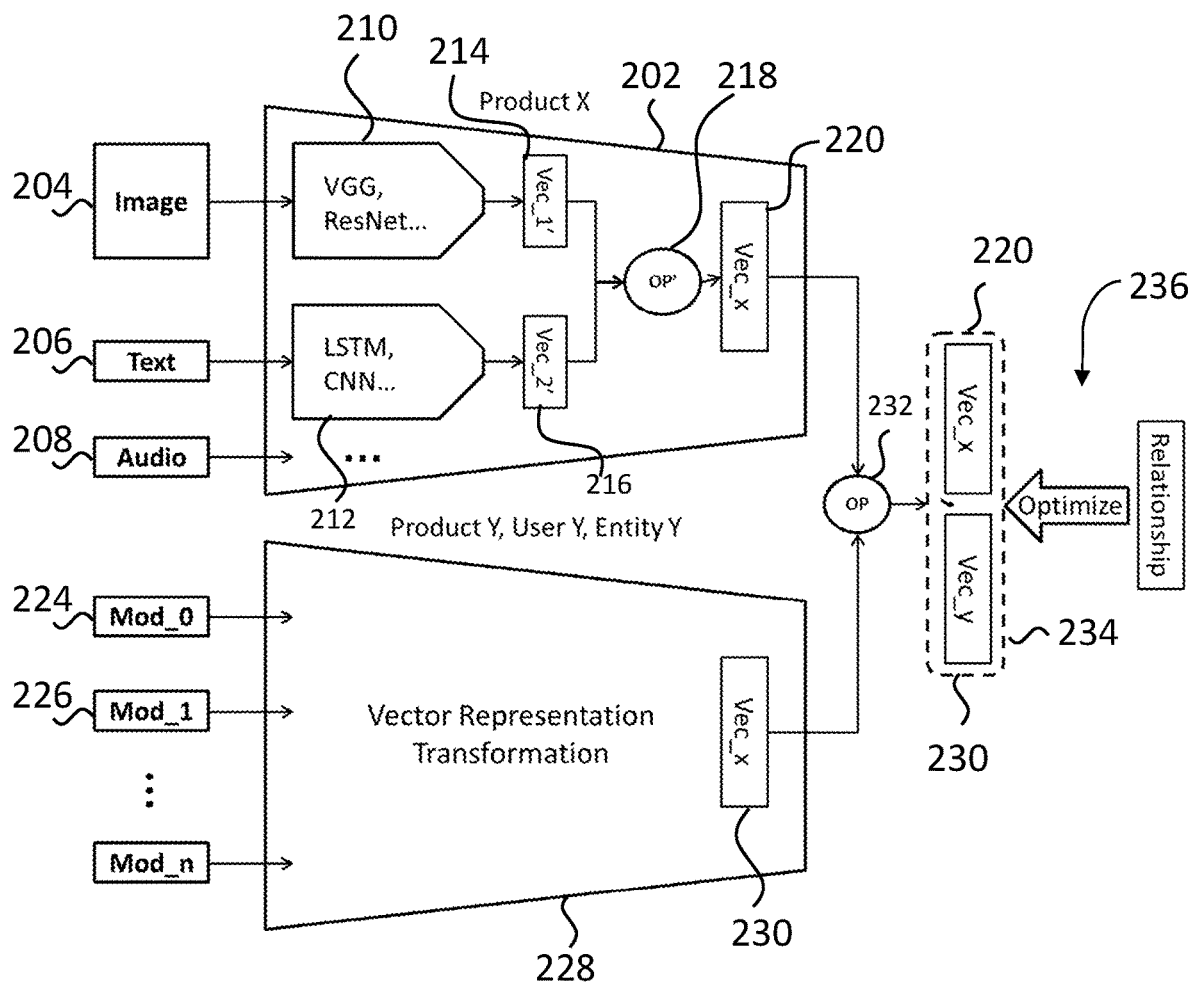
FIG. 2 illustrates a system for a learning process including multiple data modalities according to an embodiment.

FIG. 2. illustrates a system for a learning process including multiple data modalities according to an embodiment. The training process learns representations from various data modalities and combines them into a common embedding space, such as 102. The common embedding space is optimized to answer a question relating to two different entities in a certain knowledge graph.

In one embodiment, the system operates by tuples. The system collects the data of two instances (i.e., two products). Each product is projected into the embedding space. The embeddings are combined by an operation (i.e.: summation, concatenation, multiplication . . . ), the resulting vector is used for example to minimize the classification error of their relationship according to the knowledge graph.

A merge block generates a vector representation of certain products with multiple data modalities. In FIG. 2 a merge block 202 for an example "product x" is illustrated. The inputs to the merge block 202 include an image 204, text 206, and audio clip 208. Each of the three illustrated modalities are processed by a neural network that casts them into an intermediate embedding space. For example, image 204 is processed by a neural network 210. Neural network 210 can include VGG, ResNet, LSTM, CNN, and other neural networks. Similarly, text 206 is processed be a neural network 212. The remaining inputs may also be processed by neural networks.

Each of the neural networks produces a vector representation of the input. Neural network 210 creates vector 214 and neural network 212 creates vector 216. Similarly, any additional input data modalities are processed through neural networks to create vector representations of the inputs. The process of creating a vector representation is referred to as embedding.

Next, the vectors of the input sources are combined by an operation (OP') which can be the concatenation, point-wise multiplication, average, difference or other operation. In the illustrated embodiment, vector 214 and vector 216 are combined by OP' 218 into vector (Vec_X) 220. The operation process merges the information of various source modalities and produces an embedding of the common space.

A similar procedure is applied for various categories and source modalities. Input modalities 222, 224 and so on are processed by merge block 228 to generate vector 230. The illustrated process can be used with numerous data modalities and entities. For example, product categories with different modalities, users, and other entities can be processed by a merge block. The embeddings from two different entity instances are combined again by an operation (OP'). In some embodiments, the entity vector, such as vector 220, is used directly by a knowledge graph. In other embodiments, and depending on the entities being processed, two or more entity vectors, such as vectors 220 and 230, can be processed by an operation, such as OP' 232, to create a new vector 234. Finally, the entire system is optimized to minimize any error with links between the entities instances and the relationships of the knowledge graph. This optimization process 236 allows the common embedding space to respond to queries involving two or more different entities in a knowledge graph.

The optimization process minimizes the link errors, including the classification error of the links, the distance between embedding based on the relationship, etc. In one embodiment the function may be performed by a back-propagation algorithm, with a Stochastic Gradient Descent with momentum.

Embodiments allow the system to perform zero-shot learning based on multi-modal data. In this way, explicit relationships between products and other entities do not need to be made. The simultaneous use of multiple data modalities (images, audio . . . ) to represent a single instance of an entity aids in zero-shot learning. The various data modalities, such as image 204, text 206 and audio 208, allow the system to generate a knowledge graph that contains relationships between entities. In one embodiment, the knowledge graph can offer product recommendations to a consumer. A set of logical rules can be defined. Based on the embeddings of the entities, the system can infer new links and logical rules between entities. By merging the perceptual information of the entities, important features, such as shape and appearance, can be added. Moreover, relationships with new entities that were not included in the training process illustrated in FIG. 2 can be inferred.

Figure 3:
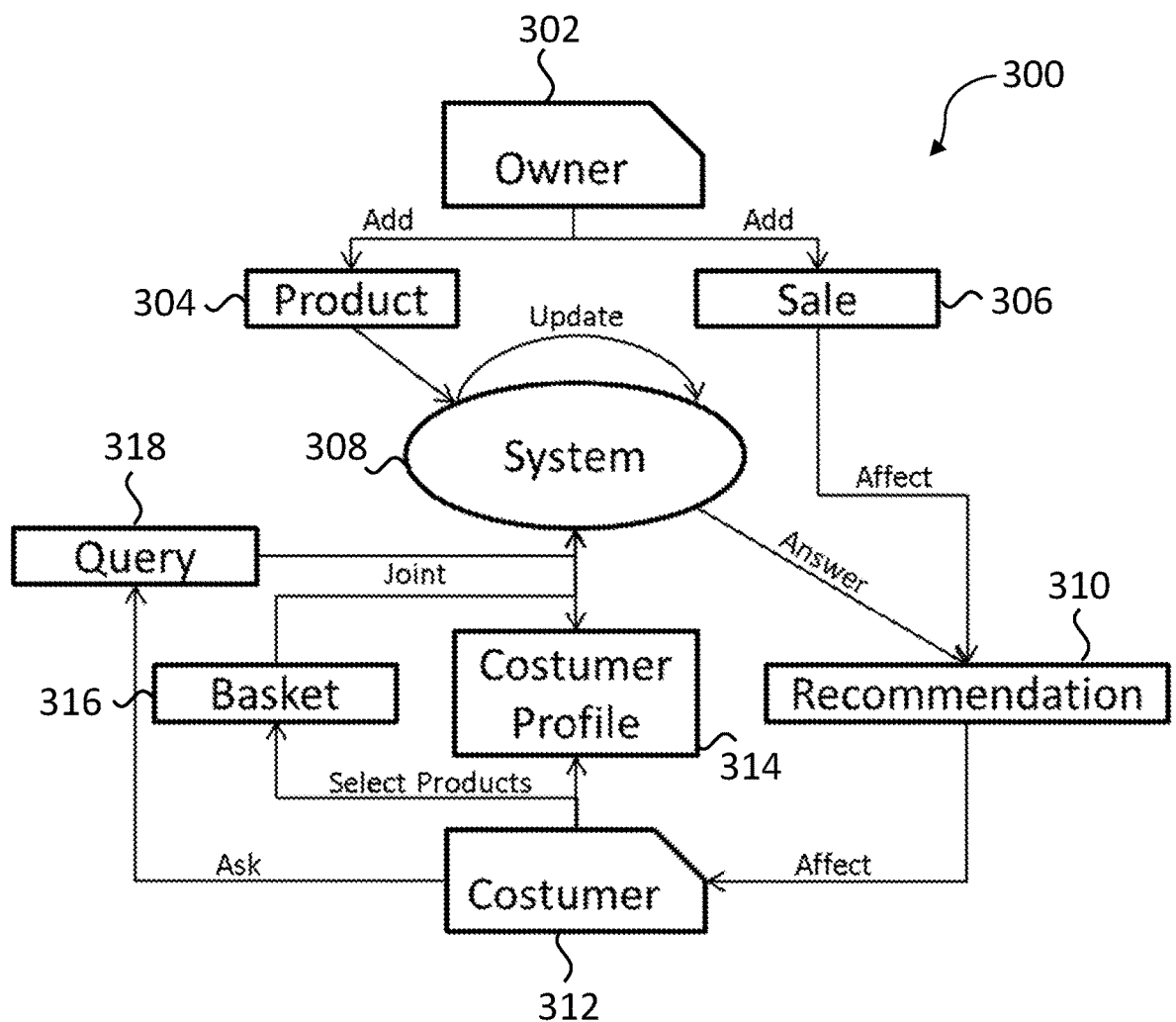
FIG. 3 illustrates a system implementing a learning process in a recommendation system according to an embodiment.

FIG. 3 illustrates a recommendation process 300 to provide recommendations to a customer. The recommendation system 308 may use a learning process, such as the one illustrated in FIG. 2. After initializing the system and building a knowledge graph as described in FIG. 2, the owner 302 of a physical shop or an e-commerce can perform various operations to provide recommendations to a customer 312. The owner 302 can add a product 304 to the system 308. In some embodiments, a product 304 is added to the system using the learning process illustrated in FIG. 2. Thus, by inputting its data modalities, the product 304 can be added to an embedding space. Adding a new product 304 can be accomplished without retraining the entire system.

In some embodiments, the owner 302 can directly affect the behavior of the system 308 in order to have certain products appear higher in the recommended rank 310. For example, the owner 302 can indicate a sale 306 on a certain product 304. The sale will directly affect the recommended rank 310 of products.

When several new products and users, such as customer 312, are added to the system 308, the system 308 can be updated by "fine-tuning" it with the new data to increase the overall performance. This tuning process can utilize, for example, optimization process 236 illustrated in FIG. 2.

In one embodiment, a customer 312 interacts with the system 308 by sending questions or queries 318 directly to the system 308. The system 308 responds to the query 318 by providing a ranking of products in a recommendation 310. When making a recommendation 310, the system uses a customer profile 314 for the customer 312. In some embodiments, the recommendations 310 are directly served to the costumer 312 through, for example, a webpage or mobile application.

In another embodiment, a shopping basket 316 and customer profile 314 are used by the system 310 to make recommendations 310. The shopping basket 316 provides a list of items that the customer 312 may be interested in purchasing. For example, the costumer 312 may save a number of ingredients used in a recipe. Using its embedding space, the system 308 recognizes that the customer is interested in a particular recipe and provides recommendations 310 related to the recipe. Additionally, the costumer profile 314, may provide additional information relating to the preferences or requirements of the customer 312 that the system 308 can take into account when generating the recommended rank 310. Thus, the system 308 may use the shopping basket 316 and customer profile 314 jointly when making recommendations 310.

Figure 4:
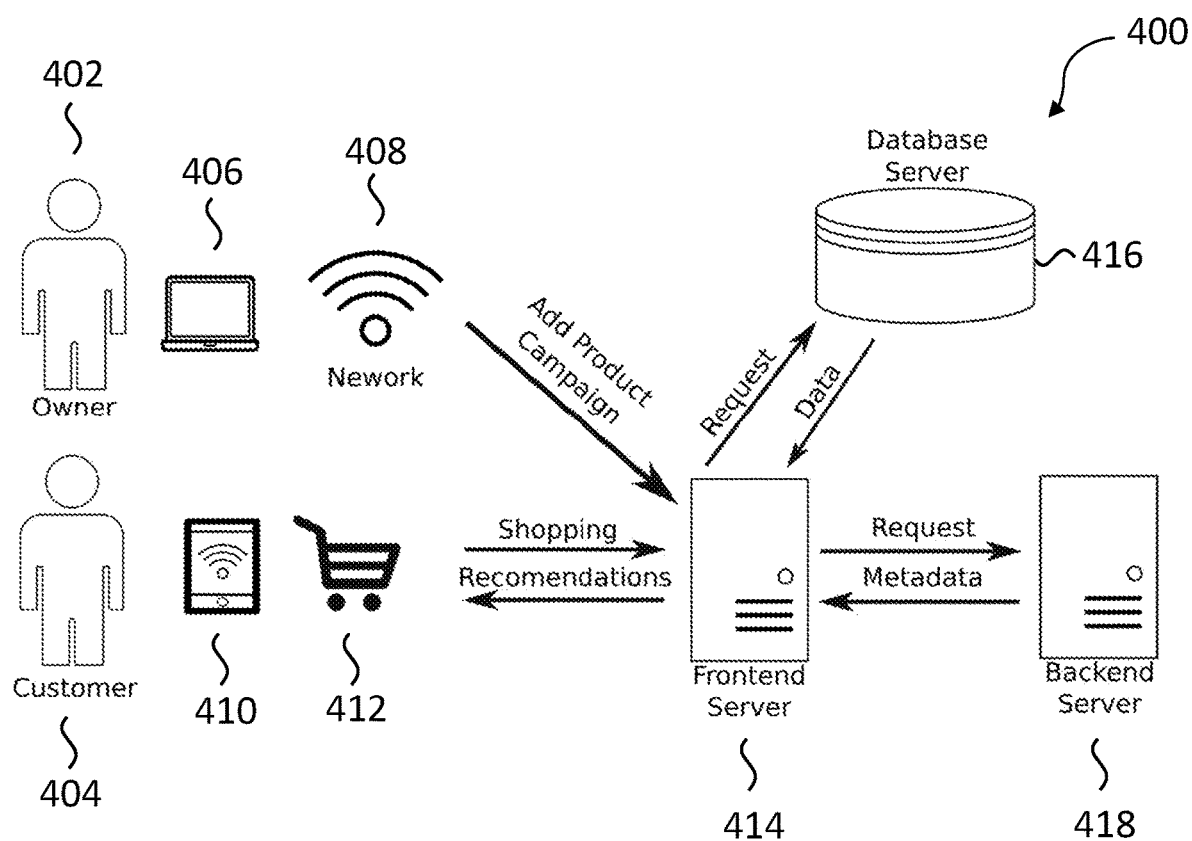
FIG. 4 illustrates a system architecture of a product recommendation system in a retail system according to an embodiment.

FIG. 4 illustrates a system architecture of a product recommendation system 400 in a retail system according to an embodiment. A database server 416 stores information related to varies different products and users 404. Information can include images, text reviews, user data, and other data. A frontend server 414 connects to a network 408 such as the Internet. The network 408 is the interface between the owner 402 and/or customers 404 and the product recommendation system 400. In the illustrated embodiment, the network 408 is shown connecting the frontend server 414 through a computer 406 to the owner 402. Similarly, a customer 404 may connect a computer or device, such as mobile device 410, to the frontend server 414 using a wireless or wired connection to a network.

The customer 404 may use the device 410 to submit profile information and to shop, add products to a shopping cart 412, or add products to another list such as a wish list. A backend server 418 contains the parameters of the trained neural network and generates product and other recommendations for a customer.

The owner 402 can add new products to the systems by remotely connecting to the frontend server 414 through a device, such as computer 406. The frontend server 414 formats and sends the high-end information (images, text, product attributes, etc.) to the database server 400 or updates the system in the backend server 418 by sending ranking modifiers, adding new entities to the model, or fine-tuning the model. The user 404 accesses the product recommendation system 400 though the frontend server 414. Information can be obtained from the database server 416 and recommendations and other metadata can be obtained from the backend server 418. In some embodiments, the frontend server 414 automatically collects data from the customer 404 and from the customer shopping basket 412. The frontend server then contacts the backend server 418 to obtain recommendations and sends those recommendations to the customer device 410.

Figure 5:
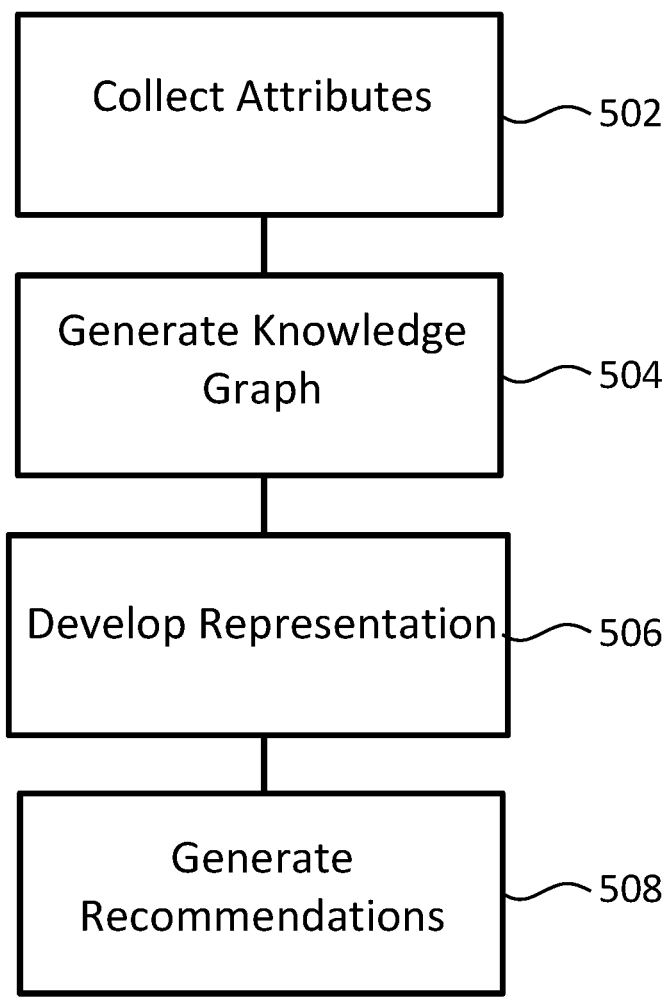
FIG. 5 is a flow diagram illustrating a learning process according to an embodiment.

FIG. 5 is a flow diagram illustrating a learning process according to an embodiment. At step 502, various attributes for an entity are collected. Attributes include information, such as multimodal data and information provided by a system owner or other user. An entity may be any type of input to the system. For example, entities include a user, a group of users, a product, or a group of products of a certain category. Thus, a dataset of entities, such as products and users and their attributes is collected.

At step 504, the system generates a knowledge graph. The knowledge graph stores information relating to the various entities. The system develops relationships between the entities in the knowledge graph. The knowledge graph encodes the various relationships that link different entities together. It is possible to encode complex relationships between, for example, costumers and products.

At step 506, the system learns a representation of the knowledge graph. The system leans a representation of the entities, relationships and attributes in the knowledge graph. The representation of the knowledge graph, is the projection that is learned. The projection is the converted images, or attributes, into a vector (embedding). The knowledge graph, is a data structure that contains statements associating information. For example (tomato, isUsedFor, salad), (lettuce, isUsedFor, salad), (olives, isUsedFor, Salad) are example statements. Therefore, based on the data (i.e.: images of tomatoes, lettuce, olives . . . ) the system learns a projection, that maps them into an embedding space that satisfies the condition of the knowledge graph. Later, if an image of a cucumber is input, the system may determine its use even if the triplet (cucumber, isUsedFor, salad), was not part of the knowledge graph during the training. Since a cucumber is a vegetable, the system can still infer that it may be used for salad.

At step 508, the system generates recommendations. In one embodiment, the recommendations are for a customer. The recommendations are based on the knowledge graph and the relationships between the entities in the knowledge graph.

Figure 6:
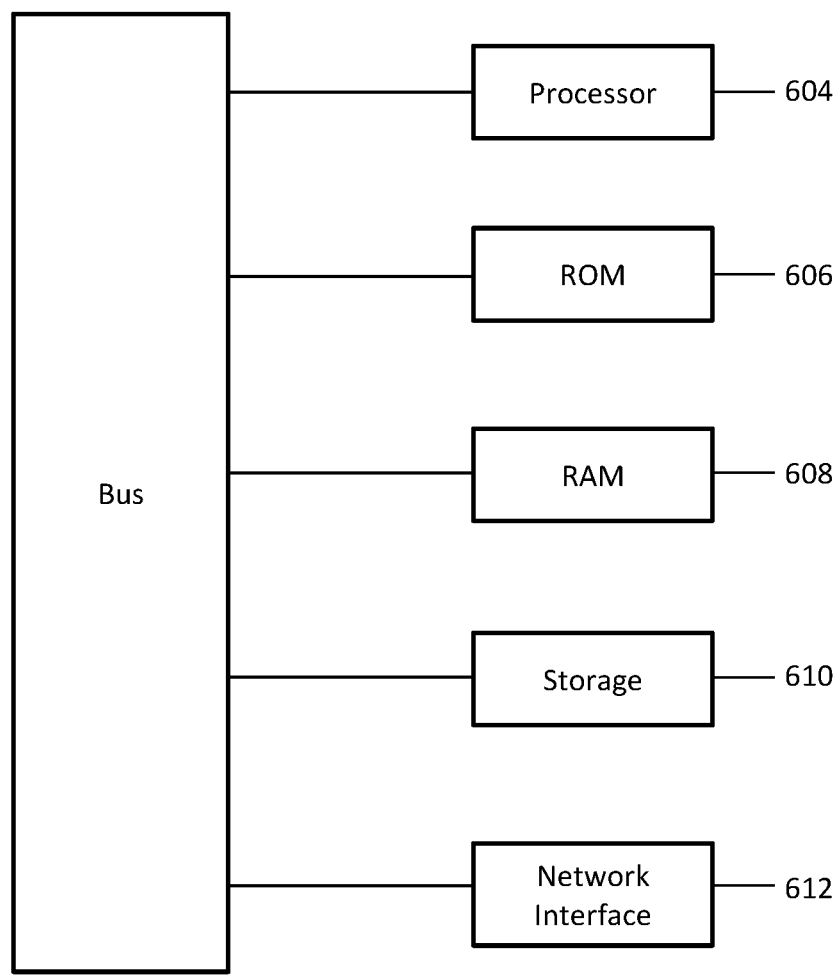
FIG. 6 is a block diagram of a processing system according to one embodiment.

FIG. 6 is a block diagram of a processing system according to one embodiment. The processing can be used to implement the recommendation system, servers, and user devices described above. The processing system includes a processor 604, such as a central processing unit (CPU) of the computing device, that executes computer executable instructions comprising embodiments of the system for performing the functions and methods described above. In embodiments, the computer executable instructions are locally stored and accessed from a non-transitory computer readable medium, such as storage 710, which may be a hard drive or flash drive. Read Only Memory (ROM) 706 includes computer executable instructions for initializing the processor 704, while the random-access memory (RAM) 708 is the main memory for loading and processing instructions executed by the processor 704. The network interface 712 may connect to a wired network or cellular network and to a local area network or wide area network, such as the internet.

All references, including publications, patent applications, and patents, cited herein are hereby incorporated by reference to the same extent as if each reference were individually and specifically indicated to be incorporated by reference and were set forth in its entirety herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for generating a product recommendation in a retail system, the method comprising:
  collecting, by the retail system, a dataset containing a plurality of entities and attributes for the entities, wherein a first entity and a second entity are grouped into a tuple, by performing steps comprising:
    generating, using a first neural network, a vector representation of a first input for a first entity in the plurality of entities;
    generating, using a second neural network, a vector representation of a second input of the first entity in the plurality of entities;
    combining the vector representation of the first input and the vector representation of the second input into a first entity vector representation; and
    combining the first entity vector representation with a second entity vector representation into a combined entity vector;
  storing, by the retail system, the combined entity vector in a knowledge graph;
  learning, by the retail system, a representation of the plurality of entities, attributes and relationships stored in the knowledge graph;
  performing, by the retail system, zero-shot learning for a new entity and attributes for the new entity;
  storing, by the retail system, the new entity and attributes for the new entity in the knowledge graph;

generating, by the retail system, a first recommendation for a user based on the knowledge graph;

receiving, by the retail system, data from the user;

inferring, by the retail system, a new rule between the first entity and the second entity in the plurality of entities; and generating, by the retail system, a second recommendation for the user based on the knowledge graph, including the new rule and the data from the user.

2. The method according to claim 1, wherein performing zero-shot learning further comprises:

generating relationships between the new entity and the plurality of entities.

3. The method according to claim 1, wherein the entities include at least a user and a product.

4. The method according to claim 1, wherein the attributes comprise multimodal data.

5. The method according to claim 4, wherein the multimodal data includes at least one of text, an image, and an audio clip.

6. The method according to claim 1, wherein generating a recommendation for a user further comprises:

automatically generating the recommendation for the user based on the knowledge graph.

7. The method according to claim 1, further comprising learning a second representation of the plurality of entities, attributes and relationships stored in the knowledge graph which includes the new entity.

8. The method according to claim 1 further comprising storing a customer profile for the user.

9. The method according to claim 1 wherein generating a recommendation for a user based on the knowledge graph further comprises analyzing a shopping basket associated with the user.

10. The method of claim 1, wherein providing the recommendation to the user further comprises transmitting the recommendation to a user device.

11. A recommendation system comprising one or more processors which, alone or in combination, are configured to provide for performance of the following steps:

collecting, by the retail system, a dataset containing a plurality of entities and attributes for the entities, wherein a first entity and a second entity are grouped into a tuple, by performing steps comprising:

generating, using a first neural network, a vector representation of a first input for a first entity in the plurality of entities;

generating, using a second neural network, a vector representation of a second input of the first entity in the plurality of entities;

combining the vector representation of the first input and the vector representation of the second input into a first entity vector representation; and combining the first entity vector representation with a second entity vector representation into a combined entity vector;

storing, by the retail system, the combined entity vector in a knowledge graph;

learning, by the retail system, a representation of the plurality of entities, attributes and relationships stored in the knowledge graph;

performing, by the retail system, zero-shot learning for a new entity and attributes for the new entity;

storing, by the retail system, the new entity and attributes for the new entity in the knowledge graph;

generating, by the retail system, a first recommendation for a user based on the knowledge graph;

receiving, by the retail system, data from the user;

inferring, by the retail system, a new rule between the first entity and the second entity in the plurality of entities; and generating, by the retail system, a second recommendation for the user based on the knowledge graph, including the new rule and the data from the user.

12. The recommendation system according to claim 11 further configured to generate relationships between the new entity and the plurality of entities.

13. The recommendation system according to claim 11, wherein the entities include at least a user and a product.

14. The recommendation system according to claim 11, wherein generating a recommendation for a user further comprises:

automatically generating the recommendation for the user based on the knowledge graph.

15. The recommendation system according to claim 11, wherein generating a recommendation for a user based on the knowledge graph further comprises analyzing a shopping basket associated with the user.

* * * * *